(12) United States Patent
Hrovat et al.

(10) Patent No.: US 6,184,821 B1
(45) Date of Patent: Feb. 6, 2001

(54) ON-BOARD GPS SENSORS SYSTEMS

(75) Inventors: Davorin David Hrovat, Ann Arbor; Michael Glenn Fodor, Dearborn; John Loring Yester, Bloomfield Hills, all of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/232,610

(22) Filed: Jan. 19, 1999

(51) Int. Cl.[7] .............................. H04B 7/185; G01S 5/02
(52) U.S. Cl. .............................. 342/357.08; 701/215
(58) Field of Search .................. 342/357.14, 357.08, 342/357.06, 357.03; 701/215

(56) References Cited

U.S. PATENT DOCUMENTS

| 5,999,878 | * | 12/1999 | Hanson et al. | 701/208 |
| 6,052,647 | * | 4/2000 | Parkinson et al. | 701/215 |
| 6,061,631 | * | 5/2000 | Zhang | 701/213 |

* cited by examiner

*Primary Examiner*—Theodore M. Blum
(74) *Attorney, Agent, or Firm*—Mark L. Mollon

(57) ABSTRACT

GPS sensors (14, 16; 30, 32, 34, 36) arranged in certain geometries in an automotive vehicle (10) to provide information that is processed by an on-board processor (18; 40) to derive parameters useful for warning, control, and/or documentation

3 Claims, 2 Drawing Sheets

ON-BOARD GPS SENSORS SYSTEMS

BACKGROUND OF THE INVENTION

1. Field of the Invention

This invention relates generally to on-board GPS sensor systems for deriving parameter values useful during the operation of moving vehicles, especially automotive vehicles traveling along roads. Such a system may derive values of parameters defining aspects of vehicle dynamics, and these values may be used in furtherance of certain warning and/or control functions.

2. Background Information

The Global Positioning System, or GPS, is a constellation of earth-orbiting satellites that continually transmit their positions in space. A known GPS receiver, or GPS sensor, is able to establish its position and velocity relative to the earth's surface by processing information obtained from GPS satellites. As a GPS sensor moves latitudinally and/or longitudinally across the earth's surface, it is capable of continually presenting its position with reference to a two-dimensional, reference frame that comprises coordinates corresponding to latitude and longitude on the earth's surface, and the sensor is also capable of presenting its velocity as a vector referenced to such a coordinate system.

It is known to place GPS sensors on automotive vehicles so that position and velocity information relative to the earth's surface is available on-board.

The value of the sideslip angle of a moving vehicle, and/or the yaw rate, can be useful in various situations involving vehicle operation. For example, such information may be an indicator of a change in road surface conditions potentially causing loss of traction. As such, sideslip-angle-related information can be a useful input to a processor in furtherance of performing warning and/or control functions.

It is known to calculate the sideslip angle of a moving vehicle from measurements of both the longitudinal velocity and the lateral velocity of the vehicle. Lateral velocity may be measured by mathematical integration of the output signal of a lateral acceleration sensor. Because sideslip angle measurements are often relatively small, increased precision of such measurements is believed beneficial. Moreover, it is believed that an ability to obtain more precise measurements with cost-effective devices could contribute toward more widespread usage of warning and/or control systems for which such information is a useful input.

SUMMARY OF THE INVENTION

The present invention is believed to provide a solution for more precise and cost-effective on-board measurement of parameters related to vehicle dynamics, especially for mass-produced automotive vehicles. Accordingly, the invention offers the potential for more widespread usage of warning and/or controls systems for which such information is a useful input.

One general aspect of the invention relates to novel configurations of GPS sensors in automotive vehicles. Such novel configurations present information for processing by on-board processors to yield relevant parameter measurements.

Another general aspect relates to a system for deriving a value for a parameter defining an aspect of dynamics of a moving object traversing a multi-dimensional reference frame, the system comprising: plural sensors each disposed at a different situs on the object, each sensor being in radio communication with a positioning system having multiple stations each of which repeatedly broadcasts its respective position, and each sensor presenting information describing at least one of its position and velocity with reference to the multi-dimensional reference frame as the moving object traverses the reference frame; and a processor for processing information presented by the sensors with other vehicle-related information to derive a value for the parameter.

Still another general aspect relates to a method for deriving a value for a parameter defining an aspect of dynamics of an automotive vehicle traversing the earth's surface referenced to a multi-dimensional reference frame, the method comprising: disposing each of plural sensors at a different situs on the vehicle; placing each sensor in radio communication with a positioning system having multiple stations each of which repeatedly broadcasts its respective position; and processing at least one of sensor position and sensor velocity information presented by the sensors with reference to the multi-dimensional reference frame as the vehicle traverses the earth's surface to derive a value for the parameter.

Still another general aspect relates to an automotive vehicle comprising: plural GPS sensors each disposed at a different situs on the vehicle, each sensor being in radio communication with a global positioning system of earth-orbiting satellites that repeatedly broadcast their respective positions, and each sensor presenting information describing at least one of its position and velocity with reference to a multi-dimensional reference frame as the vehicle traverses the earth's surface; and a processor for processing information presented by the sensors with information describing their geometric relationship on the vehicle to derive information related to an aspect of vehicle operation.

Still another general aspect relates to a method for determining a travel lane boundary violation by an automotive vehicle traveling on a road surface having a defined travel lane, the method comprising: providing plural sensors on the vehicle to substantially define at least a portion of the vehicle perimeter as viewed in plan; placing each sensor in radio communication with a positioning system having multiple stations each of which repeatedly broadcasts its respective position; and processing information presented by the sensors to describe the track of the vehicle perimeter with reference to a multi-dimensional reference frame as the vehicle travels along the road surface; comparing the track of the vehicle perimeter with a stored map of the defined travel lane; and detecting violation of a boundary of the defined lane by the track of the vehicle perimeter.

Still another general aspect relates to a method for re-orienting the position of a moving vehicle on an on-board electronic map of an earth area proximate the vehicle's position wherein existing orientation is utilizing information from at least one on-board GPS sensor, the method comprising: providing at a defined position on the earth area proximate the vehicle's position, a monument that broadcasts a signal of its GPS position; and utilizing the signal from the monument to re-orient the GPS position of the vehicle to the electronic map.

Other general and more specific aspects will be set forth in the ensuing description and claims.

BRIEF DESCRIPTION OF THE DRAWINGS

The drawings that will now be briefly described are incorporated herein to illustrate the inventive principles via an exemplary preferred embodiment and a best mode presently contemplated for carrying out those principles.

DESCRIPTION OF THE PREFERRED EMBODIMENT(S)

As mentioned above, a known GPS receiver, or GPS sensor, is able to establish its position and velocity relative to the earth's surface by processing information obtained from GPS satellites. Such a GPS sensor can continually present its position with reference to a two-dimensional, reference frame that comprises coordinates corresponding to latitude and longitude on the earth's surface, and the sensor is also capable of presenting its velocity as a vector referenced to such a coordinate system.

Figure 1:
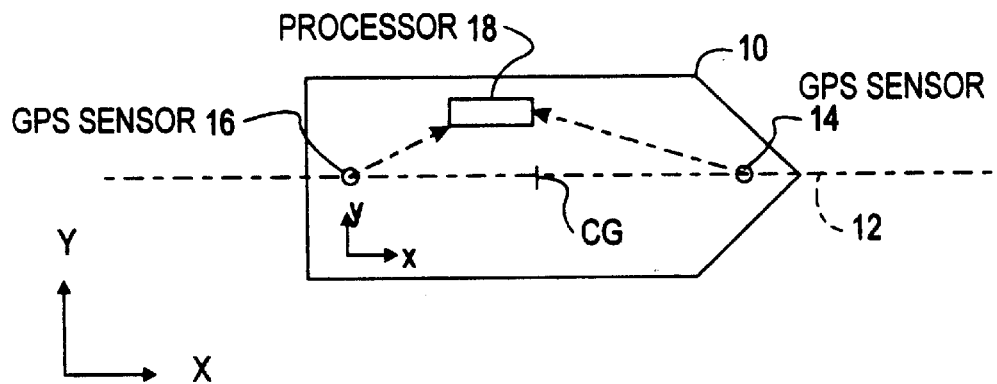
FIG. 1 is a schematic top plan snapshot view of an automotive vehicle traveling in a straight line.

FIG. 1 is a schematic snapshot portrayal of a top plan view of an automotive vehicle 10 that is moving along an underlying road surface in one direction across a two-axis inertial reference frame. In the FIG. 1 example, vehicle 10 is moving in a straight line along one axis of the two-axis, reference frame coordinate system, specifically moving in the positive direction along the X-axis of an X-Y reference frame coordinate system in this instance. Because the lateral velocity of vehicle 10 is zero, a vector referenced to the X-Y coordinate frame to represent velocity of the vehicle has no Y-axis component, only an X-axis one.

FIG. 1 further shows vehicle 10 to have its own imaginary, two-dimensional body-fixed coordinate frame comprising an x-axis and a y-axis, with the x-axis parallel to the X-axis of the inertial reference frame and the y-axis parallel to the Y-axis of the reference frame. An imaginary vertical plane 12 that contains a longitudinal centerline of vehicle 10 passes longitudinally through the vehicle's center of gravity CG parallel to the longitudinal direction of motion of the vehicle in the positive X-axis direction. Plane 12 remains parallel to the X-axis as the vehicle moves longitudinally in the X-axis direction without any Y-axis movement.

Figure 2:
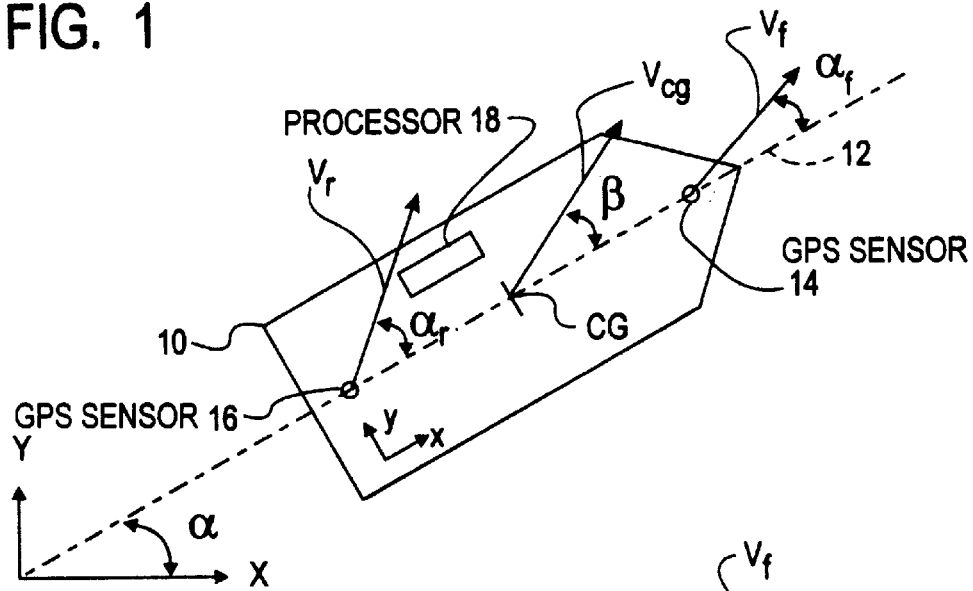
FIG. 2 is a view similar to FIG. 1, but after a change in the travel direction of the vehicle, and including certain vector information.

FIG. 2 is a schematic snapshot portrayal of the top plan view of the vehicle 10 that previously had been moving strictly in the positive X-axis direction as described in FIG. 1, but that has now experienced a disturbance which has both rotated plane 12 out of parallelism with the X-axis and displaced the center of gravity CG in the positive Y-axis direction. As a result, the instantaneous velocity vector of the center of gravity CG now has both a Y-axis component as well as an X-axis one.

At this juncture, it is deemed appropriate to mention that FIG. 2 is not necessarily to scale or proportion, because a principal purpose of this FIG. is to graphically present inventive principles without crowding. FIG. 2 is useful in explaining how a measurement of the sideslip angle $\beta$ may be obtained in accordance with the principles of the present invention.

In accordance with such principles, two GPS sensors 14 and 16 are disposed on vehicle 10 for providing information obtained from the Global Positioning System. Each sensor 14, 16 occupies a respective situs on vehicle 10 suitable for providing information that can be processed by an on-board processor 18 to yield measurements of one or more parameters involving one or more aspects of the vehicle's dynamics, the sideslip angle $\beta$ being the particular parameter being measured in this example. Sensors 14, 16 are preferably disposed on plane 12 spaced as far apart as conveniently possible. Preferably, sensor 14 is disposed forward of the vehicle center of gravity CG, while sensor 16 is disposed aft.

Each sensor 14, 16 is in radio communication with the GPS and is capable of presenting its GPS position as a respective coordinate pair referenced to the latitude-longitude coordinate system of the inertial reference frame. Because each sensor is thus capable of providing its instantaneous position as a coordinate pair referenced to the earth's surface, the application of known calculation techniques in the Cartesian coordinate system allow processor 18 to execute a programmed algorithm for calculating an angle $\alpha$ depicted in FIG. 2 to represent the angle between the vehicle centerline and one axis of a two-axis reference frame coordinate system, specifically the X-axis of the X-Y coordinate system. If, as should be appreciated from FIG. 1, the angle $\alpha$ is understood to have had a zero value before the aforementioned disturbance occurred, a calculation made after the disturbance, such as for the condition of FIG. 2, will yield a non-zero value for angle $\alpha$.

Each sensor 14, 16 is also capable of presenting information, referenced to the latitude-longitude coordinate system of the reference frame, that defines respective velocity vector $V_f$ and $V_r$ indicative of magnitude of the instantaneous velocity of the respective sensor along a direction referenced to the two independent dimensions of the reference frame, namely latitude and longitude on the earth's surface. Processor 18 contains stored dimensional data that relates the situs of the vehicle center of gravity CG to the situs of each of the two sensors 14, 16 on the vehicle. The processor processes the velocity vector information from the two sensors 14, 16, the angle $\alpha$ measurement, and that stored dimensional data to derive a velocity vector $V_{cg}$ that defines instantaneous velocity of the vehicle center of gravity along a direction referenced to latitude and longitude on the earth's surface.

Utilizing the velocity vector $V_{cg}$, the angle $\alpha$ measurement, and Cartesian coordinate principles, processor 18 executes a further algorithm for calculating an angle $(\alpha+\beta)$ equal to the sum of the vehicle centerline angle $\alpha$ and the sideslip angle $\beta$. Processor 18 provides the value of the sideslip angle $\beta$ by subtracting the angle $\alpha$ from the calculated angle $(\alpha+\beta)$.

FIG. 2 shows the sideslip angle $\beta$ to represent the angle between the longitudinal centerline of vehicle 10 and the velocity vector $V_{cg}$ that represents the instantaneous velocity, or direction of motion, of the vehicle's center of gravity CG as referenced to the reference frame. The angles of the vectors $V_f$ and $V_r$ with respect to the vehicle centerline are designated $\alpha_f$ and $\alpha_r$.

Processor 18 may have the capability of repeatedly calculating the sideslip angle and of storing values of any parameter as functions of time so that a time record of values may be developed whenever appropriate.

Figure 3:
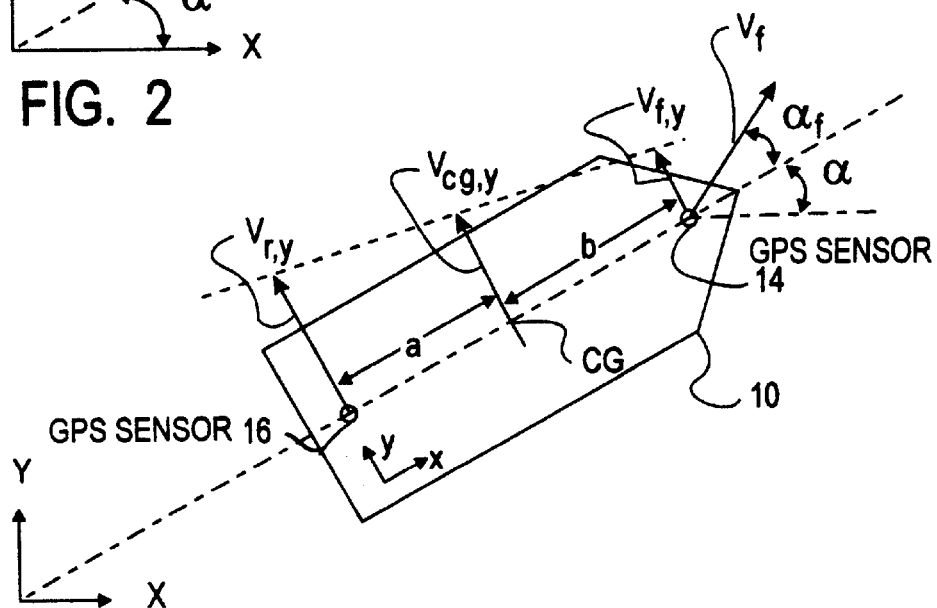
FIG. 3 is another view of FIG. 2 with another form of vector information.

FIG. 3 portrays resolution of vectors $V_f$ and $V_r$ into respective components that are parallel and perpendicular to the vehicle centerline. Assuming rigidity of the body of vehicle 10 such that the geometric relationship between the center of gravity CG and the two sensors 14, 16 is invariant, and assuming identical x-axis velocity components for each of the three, the y-axis component of velocity vector $V_{cg}$ may be calculated by processor 18 in a manner suggested by the graphical portrayal of FIG. 3 defining the relationship where:

$$V_{cg,y} = V_{f,y} + (V_{r,y} - V_{f,y})b \div (a+b)$$

Figure 4:
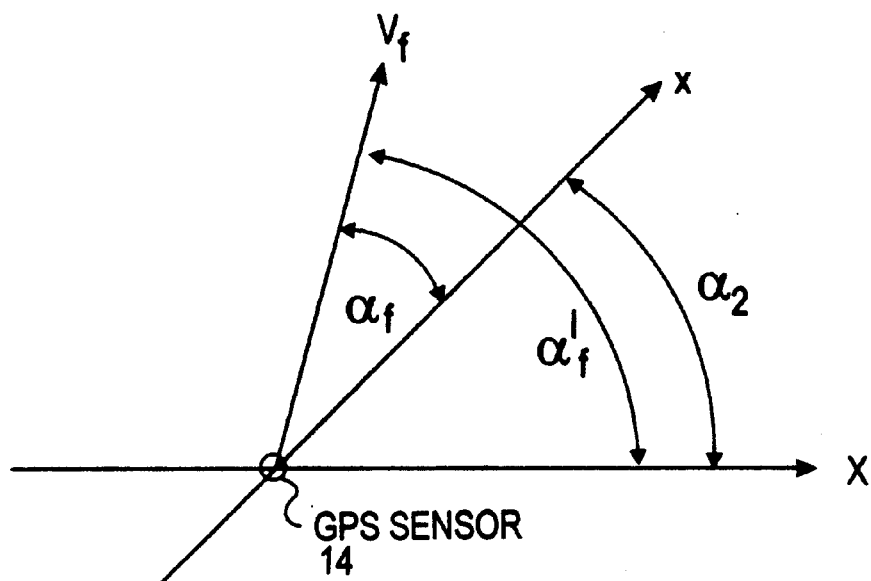
FIG. 4 is diagram showing another form of vector information.

If greater precision in the angle α measurement is desired, resort may be had to use of a sensor velocity vector, rather than the position information which the two sensors present. FIG. 4 graphically portrays this alternate calculation using the velocity vector $V_f$ and recognizing that the x-axis velocities of the sensors and the center of gravity CG are identical. From the geometry of FIG. 4, it can be shown that:

$$V_f \cos(\alpha_f - \alpha_2) = V_r \cos(\alpha_f' - \alpha_2)$$

Using this relationship, processor 18 can solve for $\alpha_2$ by iteration. From the values of $\alpha_1$ and $\alpha_2$, an estimate of a can be made using a weighting factor r such that $$\alpha = r\alpha_1 + (1-r)\alpha_2$$

where r is assigned a value greater than or equal to zero but less than or equal to unity, depending on a certain confidence in $\alpha_1$ and $\alpha_2$ that is based on vehicle forward velocity. Generally speaking, the confidence in $\alpha_2$ is high when that velocity is low, and so r will be assigned a value closer to zero in that case.

Lateral velocity or sideslip angle information may be useful in conjunction without information for performing warning and/or control functions. For example, use of lateral velocity or sideslip angle may be used to predict, or extrapolate, an expected track of a moving vehicle, and by comparing that projection against a map of the immediate vicinity of the vehicle, a driver may be forewarned of incipient departure of the vehicle from a road surface on which the vehicle is traveling. Such a map could be stored in electronic format on-board the vehicle, with the processor performing comparison of an extrapolated vehicle track against infrastructure contained in the map, and issuing a warning when appropriate.

Another driving situation where processing of GPS sensor information may be useful in performing a warning and/or a control function involves a moving vehicle approaching a certain road feature, such as an exit ramp on a freeway for example. If the evaluation and/or processing of certain parameters of vehicle operation and/or road conditions in relation to a stored map of the particular feature and its immediately proximate area suggest that the vehicle dynamics, such as forward speed and lateral speed, and/or road conditions, such as grade or traction for example, may be less than suitable for an anticipated vehicle track, the processor may initiate certain action in a corrective attempt to bring the vehicle dynamics within parameters that are more appropriate for the particular road feature and prevailing conditions and/or alert the driver to the immediate situation.

Furthermore, instead of relying solely on GPS-obtained vehicle position data to orient the vehicle position to the stored map as the vehicle approaches the particular road feature, it may be desirable to "reset" the orientation by means of an electronic monument, such as a radio beacon, that is disposed at an established position in the vicinity of the road feature and that is also marked and identified on the stored map. The electronic monument signals its identity and position to the vehicle, which then re-orients the vehicle's position on the stored map to correspond to the actual position of the vehicle relative to the beacon, as derived from the beacon signal.

Processing of lateral velocity and/or sideslip angle measurements may implement certain system control functions that may be useful in vehicle control. For example, some degree of service brake application may be made depending on the magnitude of lateral velocity or sideslip angle in relation to other parameters of vehicle operation. The degree of braking and/or which wheels are to be braked may be determined from the results of the information evaluation and processing by the processor. Suspension system characteristics may also be adjusted as a result of evaluating and processing the information obtained. In the case of a vehicle approaching an exit ramp, the performance of corrective action by the processor may be premised on a driver's intention to exit as evidenced by driver activation of the appropriate turn signal.

Certain driving situations may occasion loss of communication of the on-board GPS sensors with GPS satellites. Should that happen, another set of on-board, non-GPS, sensors (i.e., a lateral acceleration sensor, a yaw rate sensor) may temporarily substitute for the GPS sensors.

Although the example that has been illustrated and described has placed the two sensors 14, 16 on the vehicle centerline for measuring sideslip angle, certain principles of the invention are more generic. The sensor placements fore and aft on the longitudinal centerline may also be used to estimate vehicle pitch, and through appropriate filtering, road inclination. Generic principles also contemplate use of GPS sensors spaced apart in other directions on-board a vehicle, such as diagonally, and laterally. Laterally spaced GPS sensors can estimate vehicle roll, and with appropriate filtering, road crown. Diagonally spaced GPS sensors can provide composite information involving several dynamic parameters, including ones already mentioned.

Figure 5:
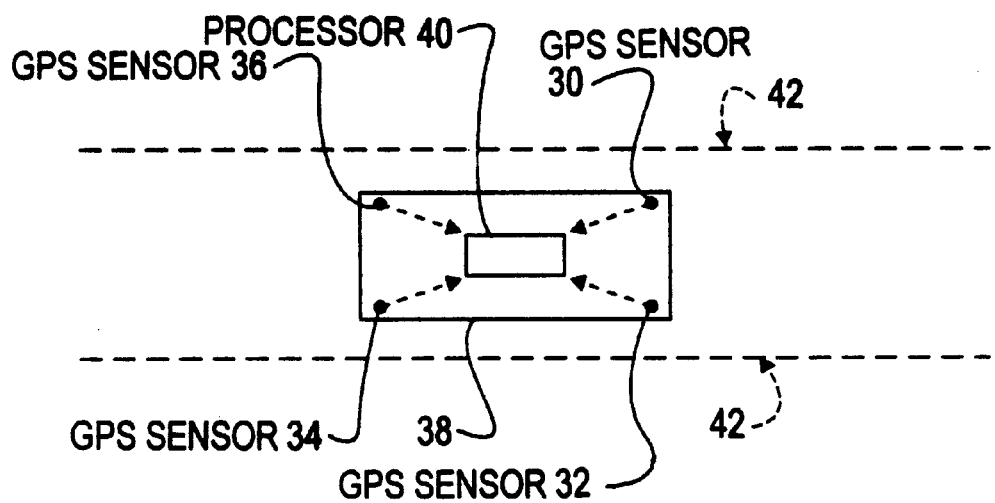
FIG. 5 is a schematic top plan snapshot view of an automotive vehicle traveling along a road surface having a marked travel lane.

Another aspect of generic inventive principles involves locating plural sensors to define the perimeter of a vehicle as viewed in plan. FIG. 5 shows four GPS sensors 30, 32, 34, 36 at four corners of a vehicle 38. Each sensor supplies its position information to a processor 40 in which the geometric relationship of the sensors on the vehicle is stored. The processor is programmed to define the vehicle perimeter, or footprint, from the foregoing information.

As the vehicle travels along the road surface, the processor compares the footprint of the vehicle perimeter against an on-board electronic map of one or more lanes 40 of the underlying road surface. Such comparison reveals the track of the vehicle relative to lane boundaries 42 and can identify and document a crossing of a lane boundary by any portion of the vehicle perimeter. In this way lane violations may be captured electronically, rather than by optical or mechanical techniques. The ability to document lane violations in this manner is believed useful for vehicle, or driver, testing, and may be considered an improvement over two known practices one of which is optical recording and the other of which involves placement of orange cones along the lane stripes to mark the lanes, and then looking for knocked-down cones to document lane violations after a vehicle has traveled past.

While a presently preferred embodiment has been illustrated and described, it is to be appreciated that the invention may be practiced in various forms within the scope of the following claims.

What is claimed is:

1. A system for deriving a value for a parameter defining an aspect of dynamics of a moving object traversing a multi-dimensional reference frame, the system comprising:

plural sensors each disposed at a different situs on the object, each sensor being in radio communication with a positioning system having multiple stations each of which repeatedly broadcasts its respective position, and each sensor presenting information describing at least one of its position and velocity with reference to the multi-dimensional reference frame as the moving object traverses the reference frame; and a processor for processing information presented by the sensors with other object-related information to derive a value for the parameter;

in which the processor processes the information provided bathe sensors with information describing the geometric relationship of the sensors on the object to derive a value for the parameter;

in which the object comprises an automotive vehicle, and the sensors comprise a first sensor and a second sensor that are spaced apart substantial y on a longitudinal centerline of the vehicle; and in which the processor executes an algorithm that processes information presented by the first and second sensors to derive a value for the lateral velocity of the center of gravity of the vehicle.

2. A method for deriving a value for a parameter defining an aspect of dynamics of an automotive vehicle traversing the earth's surface referenced to a multi-dimensional reference frame, the method comprising:

disposing each of plural sensors at a different situs on the vehicle;

placing each sensor in radio communication with a positioning system having multiple stations each of which repeatedly broadcasts its respective position; and processing at least one of sensor position and sensor velocity information presented by the sensors with reference to the multi-dimensional reference frame as the vehicle traverses the earth's surface to derive a value for the parameter;

in which the processing step comprises processing information provided by the sensors with information describing the geometric relationship of the sensors on the vehicle and deriving a value for the lateral velocity of the center of gravity of the vehicle.

3. A method for determining a travel lane boundary violation by an automotive vehicle traveling on a road surface having a defined travel lane, the method comprising:

providing plural sensors on the vehicle to substantially define at least a portion of the vehicle perimeter as viewed in plan;

placing each sensor in radio communication with a positioning system comprising multiple stations each of which repeatedly broadcasts its respective position; and processing information presented by the sensors to describe the track of the vehicle perimeter with reference to a multi-dimensional reference frame as the vehicle travels along the road surface;

comparing the track of the vehicle perimeter with a stored map of the defined travel lane; and detecting violation of a boundary of the defined lane by the track of the vehicle perimeter.

* * * * *